Aug. 19, 1969  W. O. TEMPLE  3,461,745

CONTROL LINE TENSION REGULATOR

Filed Jan. 24, 1967  6 Sheets-Sheet 1

INVENTOR,
WESCOMB O. TEMPLE

BY
Watson, Cole, Grindle & Watson
ATTORNEYS

NEUTRAL POSITION

INVENTOR,
WESCOMB. O. TEMPLE

BY Watson, Cole, Grindle & Watson
ATTORNEYS

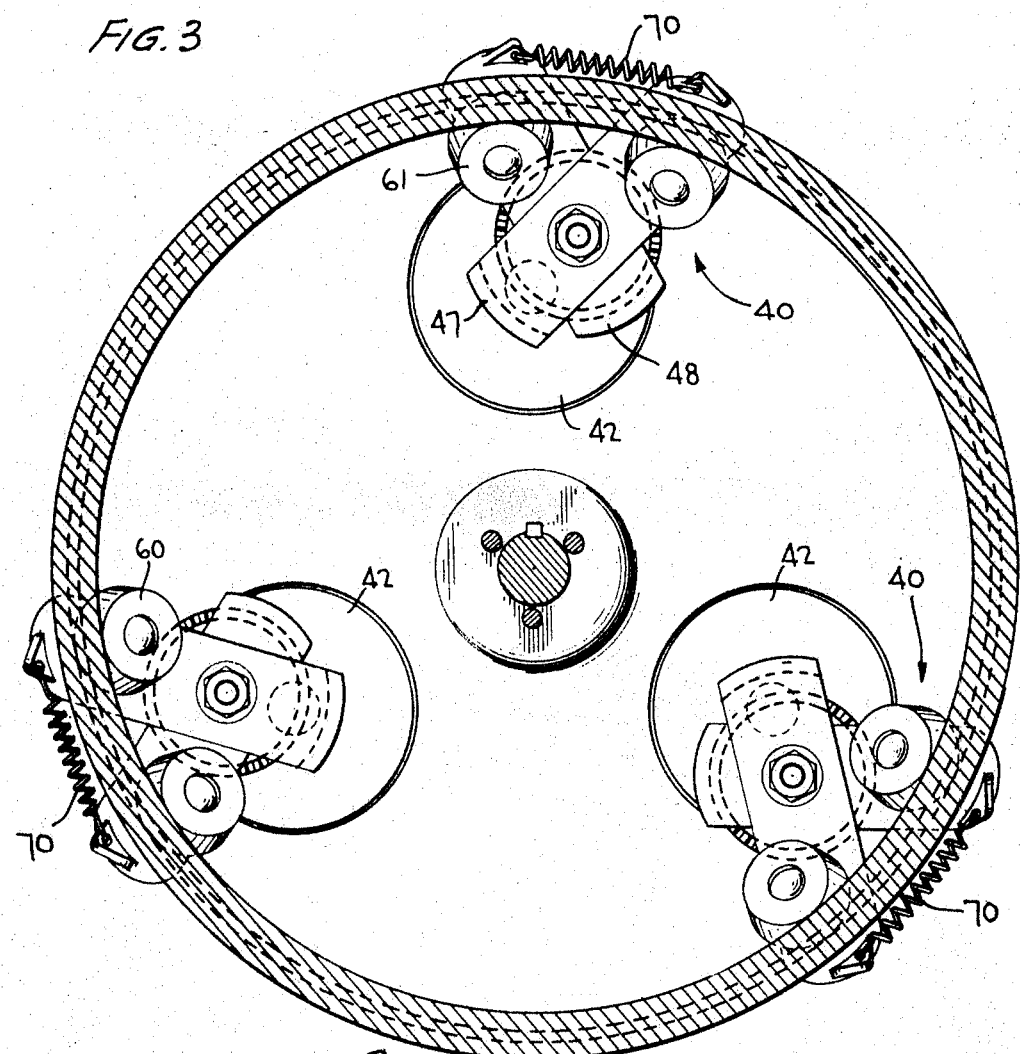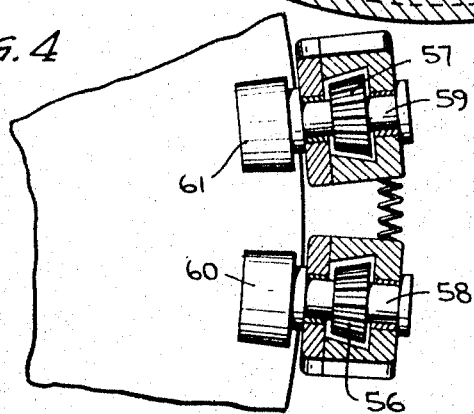

Aug. 19, 1969  W. O. TEMPLE  3,461,745
CONTROL LINE TENSION REGULATOR
Filed Jan. 24, 1967  6 Sheets-Sheet 4

INVENTOR,
WESCOMB O. TEMPLE

BY Watson, Cole, Grindle & Watson
ATTORNEYS

Aug. 19, 1969　　　　W. O. TEMPLE　　　　3,461,745
CONTROL LINE TENSION REGULATOR
Filed Jan. 24, 1967　　　　　　　　　　　　6 Sheets-Sheet 5

INVENTOR,
WESCOMB O. TEMPLE

BY *Watson, Cole, Grindle & Watson*
ATTORNEYS

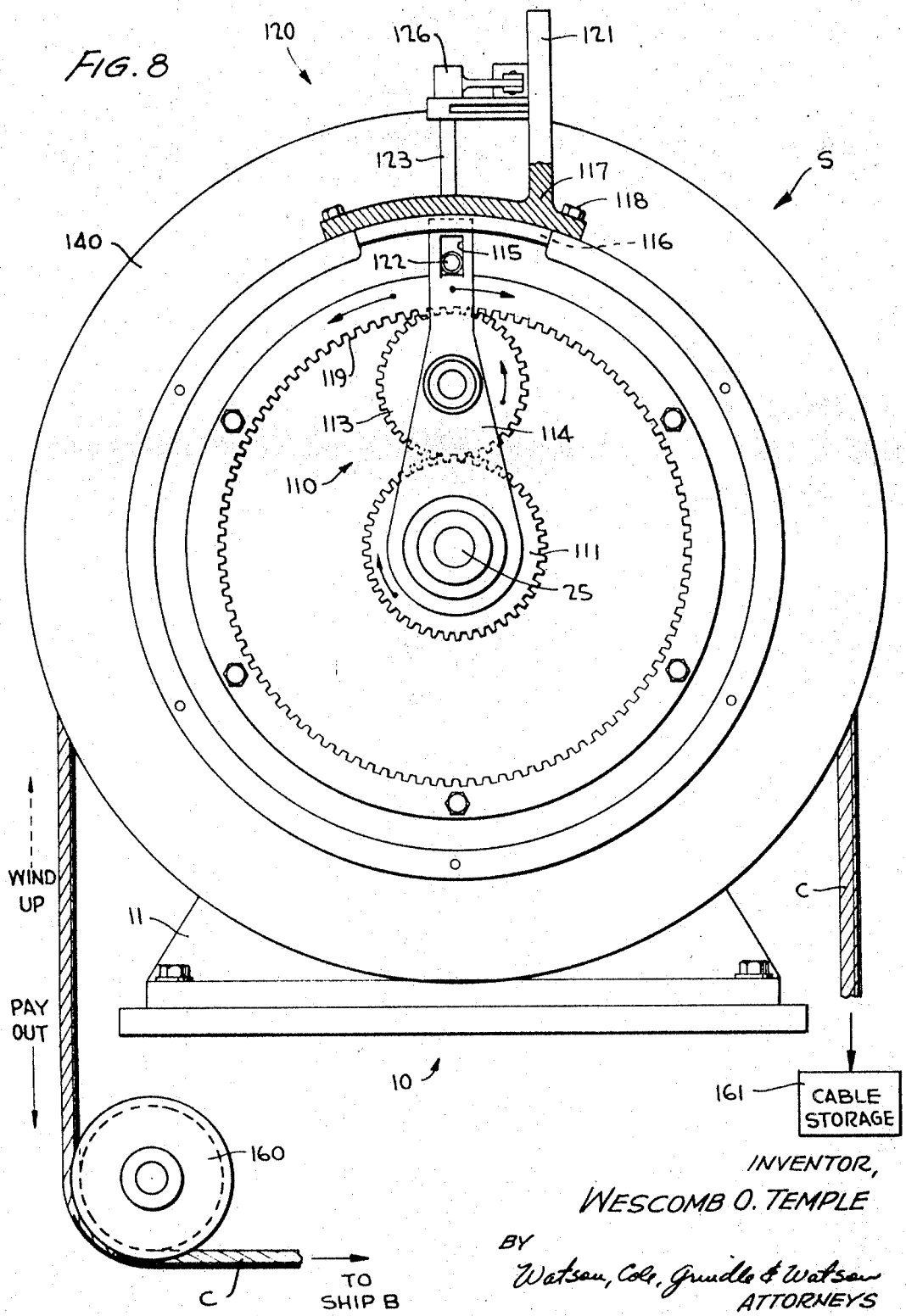

United States Patent Office 3,461,745
Patented Aug. 19, 1969

3,461,745
CONTROL LINE TENSION REGULATOR
Wescomb O. Temple, Carroll, N.H.
(R.F.D. 1, Whitefield, N.H. 03598)
Filed Jan. 24, 1967, Ser. No. 611,309
Int. Cl. F16h *3/74, 15/24*
U.S. Cl. 74—751
13 Claims

ABSTRACT OF THE DISCLOSURE

An apparatus for maintaining constant tension in a line having a power transmission utilizing a planetary gearing unit that carries dual torque control units in an orbital path; said units having friction wheels which are reversibly and continuously variably driven by an axially shiftable drive cone in response to the output torque sensed in said units. The drive wheels are tapered to match the center path of the drive cone to minimize slippage and the torque control units are pressed toward the cone by torque effect as well as being radially shiftable to maintain constant angle of attack for the same purpose. Additional torque sensor at the output is provided to improve responsiveness of the apparatus for establishing torque equilibrium.

---

The present invention relates generally to material handling apparatus and,, more particularly, this invention relates to a winch device or the like having a torque responsive transmission so as to be capable of paying out and taking in line and for automatically maintaining uniform tension in the line.

In the material handling art and with specific reference to marine loading and unloading systems for illustrating the present invention, there is a need for an apparatus which is capable of controlling a line connected between the supply and delivery points to maintain a constant tension in the control line as the material loading or unloading operation is performed. As a specific example of the type of complete system which is contemplated by the present invention, reference can be made to the patent to Pristach, 2,942,740, issued June 28, 1960, in which there is described a system that employs a control or high line that extends between ships for refueling at sea, which line serves as a support for the fuel line. As is clear, the control line must be maintained under constant tension to accommodate the constant pitching and rolling of the ships as well as the constantly varying distances which occur between the ships during such a refueling operation.

From studying this prior patent, it can be seen that control line winches alone have heretofore been generally incapable of maintaining constant tension in the control line, and as a result it has been necessary to employ a complicated system of additional lines and winches connected through counterweights and the like to compensate for this deficiency. Generally speaking, this inability of prior art winches to cope with the problem of maintaining the constant tension required in the line has been a result of an inability to convert the large amount of torque required into a reversible work output, which output is sensed and automatically varied for compensation of the variation in tension in the control line.

It will be realized that although many other environmental applications of the constant tension regulator of the present invention are possible, the principles of the invention have particular applicability to this so-called tensioned high line system and thus for ease of description it will be described in this environment. Accordingly, it is to be understood that certain aspects of the invention are concerned with any system wherein it is desirable to control rotary torque. For example, the present principles are useful in winches for controlling a line or cable for towing vessels and for attaching helicopters to ships at sea as well as for use in general purpose winches where it is desired to limit the tension in the cable. Indeed, the unique, constant torque transmission that forms an important subcombination part of the inventive apparatus may be used with advantage in the drive trains of such diverse mechanical equipment as small cars, walking beams for oil wells, pumps for fluids or fluid-solid mixtures (such as paper slurry) or anywhere the described constant tension feature is desired.

Thus, it is one object of the present invention to provide a control line tension regulator for general purpose use which is capable of automatically maintaining uniform tension in the control line.

It is another object of the present invention to provide a winch which is capable of paying out and taking in the line and automatically compensating for a change in tension in the line either during this operation or after the control line has been deployed.

It is still another object of the present invention to provide a novel form of power transmission device which is capable of controllably converting large amounts of torque between the input and output members and having automatic torque control means for compensating in changes in torque on the output member.

It is still another object of the present invention to provide such a power transmission device utilizing a planetary gearing unit and a frictional drive having a cone driver, which device automatically compensates for change in output torque into a continuously variable manner.

Briefly, the preferred embodiment of the apparatus of the present invention comprises a rotating input member which is driven in one direction at all times by a suitable power means, an output member for driving a power sheave that embraces the line or cable being controlled and a power transmission device interposed between the input and output members. The power transmission device of the invention employs a planetary gearing unit preferably employing a plurality of orbital dual torque control units, each of which includes two friction wheels for drivingly engaging a stationary driving surface of a hollow driver cone. The driver cone is mounted for axial shifting movement along the central axis of the regulator and control means are provided to shift the cone toward and away from the planetary gearing unit to variably select the proper drive path for the desired output speed as the tension in the line requires.

Preferably, the torque control units are basically of the type which automatically sense the torque on the output member, as shown for example in my previous patent No. 3,241,382, entitled Power Transmission Device, issued March 22, 1966. One important difference, however, between the torque control units disclosed in my previous patent and the torque control units of the present invention resides in the fact that one control arm of each of the dual torque control units is pivoted toward the driving surface in response to an increase in torque at the output member in each rotative direction. As a result of this improved arrangement, it will be realized that upon an increase in torque in the output member in either direction, one of the friction wheels is urged into engagement with the driving surface with proportionally increasing force thereby increasing the effective driving friction. At the same time since each of the friction wheels has a second component of force, that is a component of force tending to shift the hollow cone away from the planetary gearing unit against an adjustable biasing means, the speed and direction of rotation at the output member may be changed as required.

In the preferred embodiment of the invention, the gearing ratio of the planetary gearing unit is selected so that when the friction rollers of the dual torque control units are positoned along the path at the center of the cone, the external drive gears of the output side of the planetary gearing unit are orbiting about the driven sun gear of the output member so that the peripheral speed of the drive gears just equals their bodily rotating movement. As a results, at this point with the input member rotating at any selected speed the output member is held stationary thus maintaining the tension in the control line at a constant level.

From this central driving position according to the invention, the drive cone is adapted to be positioned either toward or away from the planetary gearing unit thus giving the driving wheel a capability of rotating in either direction to pay out or take in the line, while working toward a one-to-one ratio between the input and output members. That is, when the friction cone is shifted due to an increase in torque denoting a tensioning of the control line, the friction drive wheels are positioned relatively further out along the linner cone surface and thus they are driven faster than the orbiting speed of the planetary gearing unit causing the driven sun gear or output member to assume a continuously variable increase in speed in the opposite direction from the input member to pay out the line; i.e., as the external drive gears are driven faster than the orbiting speed of the unit, the sun gear or output member is thus caused to be driven in the opposite direction to reel out the line. Conversely, if the torque decreases denoting a slackening of the line, the torque control units are relaxed to cause a shifting of the friction cone toward the planetary gearing unit in response to the biasing means, then the friction wheels and thus the external gears rotate slower, the latter slower than the orbiting speed of the planetary unit so that the driven sun gear is carried along in the same rotative direction as the input member at a continuously increasing speed to take up the slack in the line and bring the same back to uniform tension. When uniform tension is restored it will be realized, the friction wheels have been positioned at the center of the cone holding the output member against rotation and the regulator is ready to resume another correcting function if such is needed.

In order to minimize slippage between the friction wheels of the dual torque control units and the driving cone, these wheels are tapered so that their minimum and maximum diameters are proportional to the corresponding diameters on the friction cone at the center path position. Thus, as a result of this feature, the slippage at any adjusted position toward or away from the gearing unit is minimized thereby allowing a maximum transfer of torque. Additionally, the dual torque control units are shiftable toward and away from the central axis of the transmission so that the angle of attack of the units is constant over the full range of speeds to thereby maintain the effectiveness of the torque control units substantially constant over that range.

In accordance with another feature of the present invention, there is provided a complementary torque sensing means which is interconnected to the output member so as to give the control line regulator of the present invention even more improved response in sensing the torque and applying a corresponding correction through the power transmission device. In this respect, there is provided a torque sensor arm carrying an idler gear of the drive train which causes the arm to swing in proportion to the torque being carried directly on the output member. This sensor arm is connected by a feed back linkage mechanism which serves to position the friction cone in a complementary manner with respect to the control supplied by the orbital torque control units. In accordance with a related feature, the driving sheave for the control line is preferably formed of a pair of circular plates which are movable toward and away from each other and these plates are adapted to adjustably clamp or squeeze the control line in accordance with the torque being sensed by the sensor arm.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIGURE 1a is a cross-sectional view taken along line 1a—1a of FIGURE 1;

FIGURE 3 is a detailed cross-sectional view taken along line 3—3 of FIGURE 2 illustrating the orbital dual torque control units;

FIGURE 4 is a cross-sectional view taken along the line 4—4 of FIGURE 2 showing the mounting of the friction wheels;

FIGURE 8 is an end view of the control line tension regulator illustrating the output torque sensor.

Figure 1:
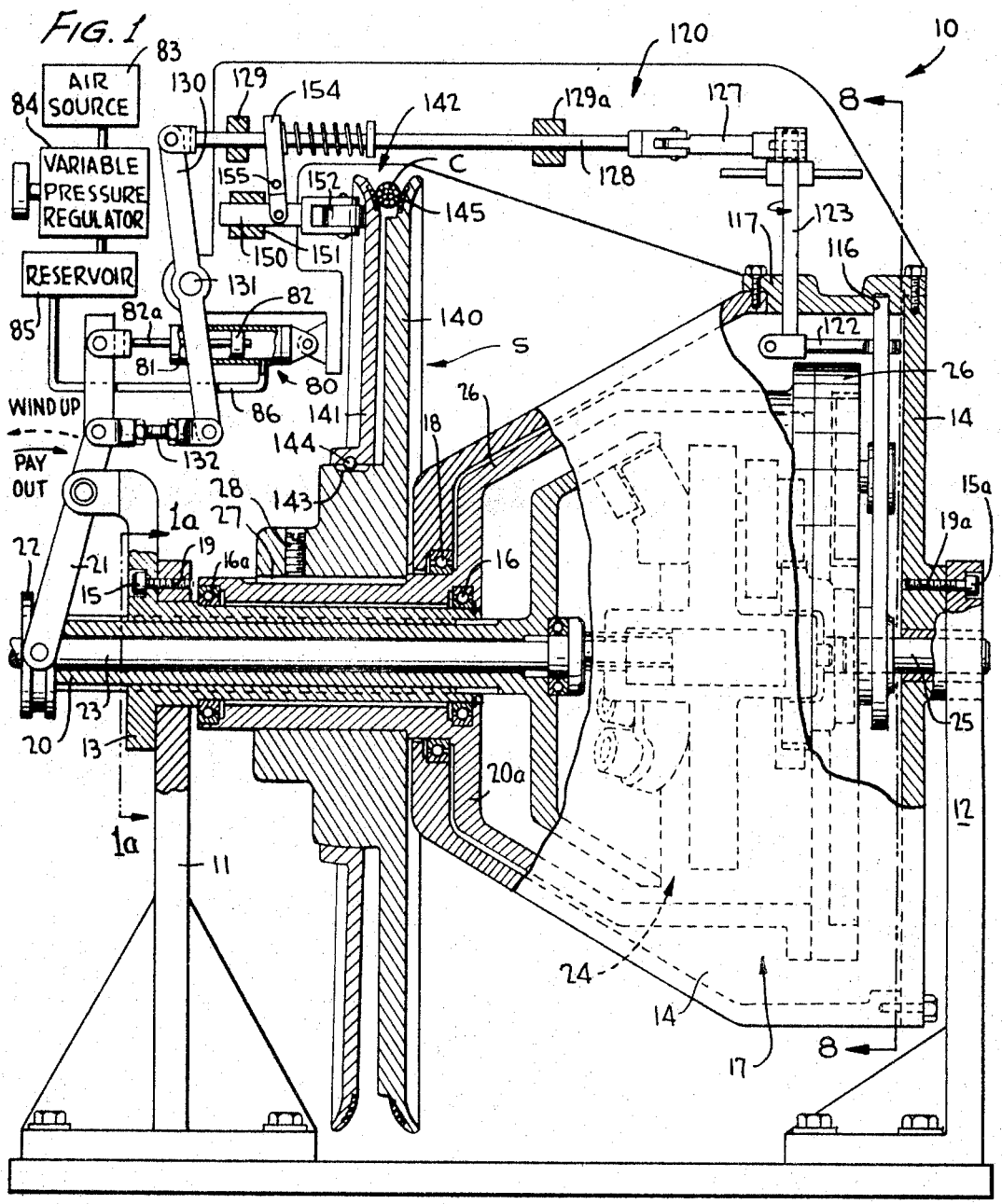
FIGURE 1 is an overall side view in schematic form of a control line regulator constructed in accordance with the present invention.

Referring now specifically to FIGURE 1 of the drawings, there is shown a control line regulator, constructed so as to depict a preferred embodiment of the apparatus of the present invention and generally designated by the reference numeral 10. The regulator 10 is supported along its central axis by a pair of upstanding support towers 11, 12; the left-hand tower 11 serving to support a fixed support sleeve 13 and the right-hand tower 12 serving to support a stationary hollow housing 14. The support sleeve 13 is fixed with respect to the upstanding support tower 11 by a locking screw 15 and carries a pair of ball bearings 16, 16a to allow rotation of a planetary-type power transmission, generally designated by the reference numeral 17 and to be described in detail later. Similarly, the stationary housing 14 carries a ball bearing 18 at its inner end thereof to isolate the same from said rotating power transmission 17.

Before proceeding further, it should be emphasized that the illustrated control line regulator 10 has been selected not only for the purpose of disclosing the specific features of a combination device capable of maintaining constant tension in a control line of a material handling apparatus, as might be used in a high-line handling system of the type shown by the above mentioned Prispatch patent, but also for the purpose of disclosing one good example of a use of the subcombination power transmission, 17, which as pointed out above has other applications to which it is equally well adapted. With this in mind, the control line regulator 10 may be described as being designed to receive such a control line or cable C on a power sheave S with the cable C being capable of being automatically maintained at a selected constant tension by the power transmission 17 in a specific manner to be explained in detail later. The entire regulator unit 10 may be rotated about its central axis for changing the angle or attitude at which the cable C is received by repositioning the stationary sleeve and housing 13, 14, respectively. This is done by merely removing respective locking screws 15, 15a and repositioning the same in the selected one of a series of threaded apertures 19, 19a provided for this purpose (see FIGURE 1a).

Positioned for sliding, nonrotative movement within the support sleeve 13 is a control member 20 which terminates in a drive cone 20a for driving the power transmission 17. By shifting said member 20 axially along the central axis of the unit 10, the output speed of the regulator 10 may be continuously varied over a selected range in a manner to be explained in detail below. This shifting can be effected by any suitable mechanism such as a control lever 21 and a conventional rotative connection 22, which allows the above described repositioning of the unit 10 about its central axis. Journaled for rotation within the control member 20 is an input shaft 23 which is adapted to be rotated in a single direction during operation by any suitable power means. This input shaft 23 in turn drives the power transmission 17 that includes a planetary gearing unit, generally designated by the reference numeral 24 (note, in particular, FIGURE 2) with the output of the planetary gearing unit 24 being transmittable to an output shaft 25 journaled in the end wall of the housing 14, and thence through a rotating output housing 26 enclosing the planetary gearing unit 24 to the power sheave S. To explain further, it can be noted from observing FIGURE 1 that the output housing 26 is rotatatively mounted on the fixed support sleeve 13 by a pair of ball bearings 16, 16a and the power sheave S is keyed to the output housing 26 by a suitable key 27 which is fixed in position by a set screw 28.

Before proceeding with a description of the overall operation of the regulator 10 and its operation to control the tension in the control line or cable C, the construction of the torque responsive planetary gearing unit 24 and its operation should be described. Thus, with specific reference to FIGURE 2 of the drawings, it can be seen that the input shaft 23 fixedly carries an impeller 30 through a pair of driving keys 31, 32 and respective set screws 33, 34 combination whereby said impeller 30 rotates with the input shaft 23 when the latter is driven by any suitable motor 35 (schematically illustrated in FIGURE 2). The composite impeller 30 preferably comprises a carrier portion 36 and a cover portion 37 which are connected together around their periphery by any number of suitable screws 38 and which composite impeller 30 is operative to carry the operating mechanism of the planetary gearing unit 24, as will now be described.

The impeller 30 includes a suitable number of equally spaced dual torque control units, generally represented by the reference numeral 40 (note FIGURES 2 and 3), positioned around the periphery of the impeller 30 and through which the driving power is to be generated and regulated, as will later appear; there actually being three of these torque control units 40 spaced 120° apart in the preferred embodiment illustrated. These control units 40 are individually, pivotally mounted on the impeller 30 by individual drive shafts 41 through which the above mentioned driving power is transmitted. Each of the drive shafts 41 rotates on suitable ball bearings 43 in eccentric mounting discs 42, which are, in turn, mounted for rotary adjustable movement in the impeller 30 by roller bearings 44 (note FIGURE 2). This is for radial adjustment of said units 40 toward and away from the central axis of the regulator 10 for a purpose which will later appear.

Each of the drive shafts 41 is stepped at its forward end and the pivotal connection between the control units 40 and said shafts 41 is effected by a pair of ball bearings 45 fitted in a first control arm 47. A second control arm 48 is also pivotally positioned on the drive shaft 41 by a pair of bearings 49 within the base of the first control arm 47 and the entire control unit 40 is held in an assembled condition by a nut 50 threadedly engaging the drive shaft 41 (note FIGURES 2 and 3). It will be realized that since the first and second control arms 47, 48 are thus independently journaled upon the drive shaft 41, they are capable of coaxial pivotal movement about the same and can operate independently to sense and correct for the torque in the drive shafts 41 but which act in concert or unison to provide driving power in the drive shafts 41.

To transmit this driving torque of the units 40 there is fixed to each drive shaft 41 an intermediate bevel drive gear 55 and meshing therewith are a pair of outer bevel drive gears 56, 57 carried by respective outer drive shafts 58, 59 on the control arms 47, 48, respectively. As can best be seen in FIGURE 4, the outer drive shafts 58, 59 carry respective friction wheels 60, 61 and through which the driving torque in the drive shaft 41 is initiated by frictional contact with inner drive surface 65 of the drive cone 20a. In other words, to accomplish the desired end result, the friction wheels 60, 61 are frictionally driven in the same direction by driving engagement with the inner drive surface 65 of the stationary drive cone 20a upon orbiting of the dual control units 40 by rotation of the input shaft 23 and the fixed impeller 30. As can be seen in FIGURE 3, the control arms 47, 48 of the orbital torque control units 40 are lightly spring biased toward each other by a spring 70 so that both of the friction wheels 60, 61 are constrained into controlled and equal forcible engagement with the driving surface 65 at all times thus providing dual frictional driving interfaces in each of said units 40. It should thus be apparent that the intermediate gear 55 is driven with improved efficiency over that obtainable if only single torque control units were employed.

Figure 2:
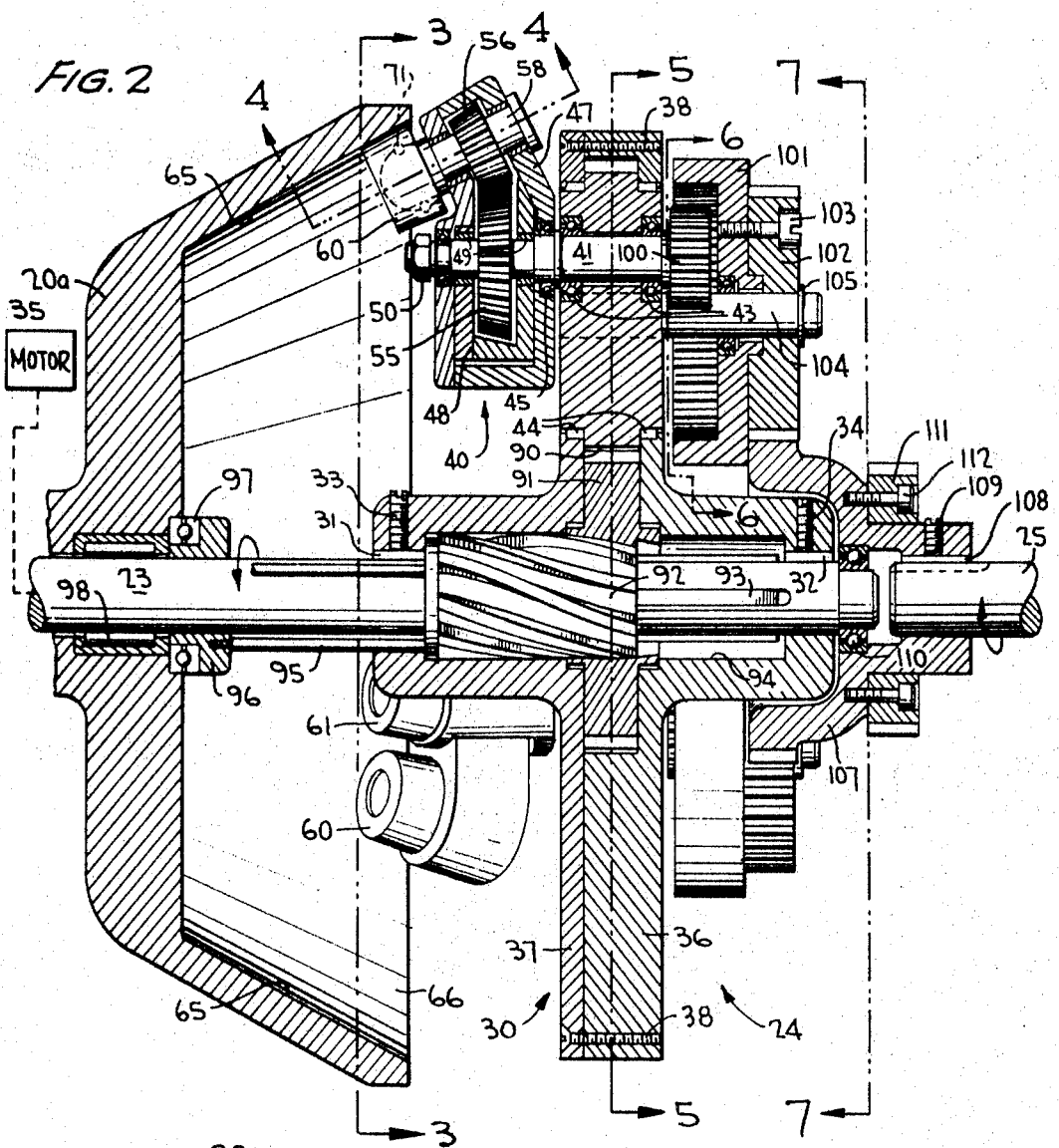
FIGURE 2 is a detailed cross-sectional view taken along the central axis of the regulator illustrating the preferred power transmission device employed in the tension regulator of FIGURE 1.
Figure 2A:
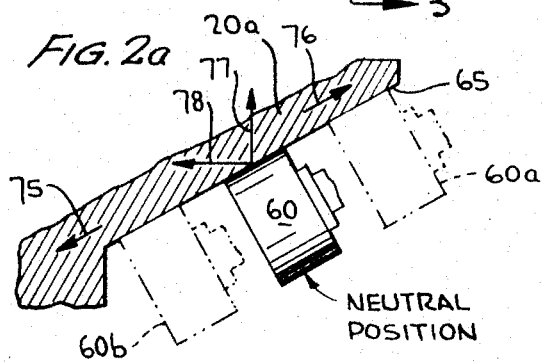
FIGURE 2a is a schematic diagram illustrating the action of the friction wheels on the inner driving surface of the friction cone of the transmission device.

For the same purpose of improving the frictional driving efficiency, the taper angle of the friction wheels 60, 61 is in direct ratio proportion to the taper of the inner surface 65 of the cone 20a at the center drive path, as denoted in FIGURE 1 and the full line position of FIGURE 2a. That is, the major and minor diameters of the wheels 60, 61 are in direct ratio proportion with the diameters of the cone 20a at this point so that there is no slippage between the driving surfaces at this home position. Furthermore, in accordance with this feature of the invention, as the cone 20a is shifted over its predetermined range both toward and away from the planetary gearing unit 24, that is, to the minor and major diameters of the driving surface 65 as illustrated in FIGURE 2a, slippage due to the inherent discrepancy in this ratio is held to a minimum thereby giving a maximum amount of traction. Advantageously, the frictional contact of the wheels 60, 61 is further improved at any adjusted position by the centrifugal force acting on the arms 47, 48 to force the same outwardly toward the driving surface 65. Lastly, the connection between the outer drive shafts 58, 59 and their respective friction wheels 60, 61 is in the form of a ball and socket joint, as shown in FIGURE 3 and by the dotted line outline in FIGURE 2, to further insure full contact over the full width of the rollers 60, 61. Of course, a suitable number of captive ball bearings 71 are provided to afford a driving relationship in the joint.

With specific reference now to FIGURE 2a of the drawings, the friction wheel 60 has been illustrated in the center path position of rotation with respect to the drive surface 65. As will be seen later in detail, this central position has been chosen in the preferred embodiment by proper selection of the gear ratio between the drive shaft 41 and the output shaft 25 to be that position where said output shaft 25 is held against rotation, and thus when the wheels 60, 61 are positioned at this midpoint, it can be referred to as the neutral or home position, as noted above. From this neutral position, the cone 20a can be shifted in the direction of the arrow 75 whereupon the wheel 60 and likewise the wheel 61 move to a new relative position 60a, indicated by the dashed line outline in this figure. It will be realized that at this new position 60a, the roller 60 rotates at a higher speed than it did in the full line neutral position as a result of the increased drive path length per revolution. Conversely, if the cone 20a is shifted in the direction of the arrow 76, the friction wheels 60, 61 assume a new relative position 60b, as also indicated by dashed line outline in this figure, and it will be clear that they now rotate at a slower speed due to the reduction in circumferential length per revolution of the effective driving path on the driving surface 65.

Because of the tapered construction of the driving surface 65 and the wheels 60, 61 and because of the spring biasing force of the spring 70 that constantly urges the friction wheels 60, 61 into engagement with said driving surface 65, the effective force at the interface is divided into two components, as represented by the arrows 77, 78 in FIGURE 2a. That is, the component force represented by the arrow 77 serves to maintain the friction wheels 60, 61 in frictional driving relationship with the surface 65 as discussed above; whereas, the component force represented by the arrow 78 tends to cause the friction cone 20a to shift axially away from the planetary gearing unit 24, which component is used to advantage in controlling the position of the cone 20a to select the proper drive path for giving the desired rotating speed of the friction wheels 60, 61, as dictated by the torque on the drive shaft 41. Offsetting or working against this component of force 78 is an automatic resilient control system 80 (note FIGURE 1) that is operative through the control lever 21 to shift the control member 20 and the integral drive cone 20a in the opposite direction. This control system 80 may take any suitable form which is effective to resiliently urge the control member 20 in the proper direction; however, a pneumatic system has been found to be particularly adapted for this purpose. Accordingly, such a system has been schematically shown in FIGURE 1 and comprises a single acting air cylinder 81 having one end fixed and a working piston 82 fastened to the free end of the lever 21. To operate the cylinder 81 there is provided in series an air source 83, a variable pressure regulator 84, a reservoir 85 and a suitable conduit 86. It will be apparent that by properly adjusting the regulator 84 the desired force to shift the control member to the right in FIGURE 1 against the component 78 generated by the dual torque control units 40 may be realized. It is noted that the reservoir 85 is selected to be sufficiently large so that the force on the piston 82 is maintained substantially constant over the full range of adjustable movement.

When the torque on the drive shafts 41 causes the component of force 78 to just equal the force generated by the cylinder 81 of the control system 80, then the wheels 60, 61 are in the neutral position (full line position of FIGURE 2a) and the tension in the cable C on the power sheave S is at the selected positive value. In other words, when the cone 20a is positioned so that the friction wheels 60, 61 are positioned at the full line position of FIGURE 2a, in the center of the driving surface 65, the compression force in the cylinder 81 just offsets the component of force 78 due to the rollers 60, 61 and at any other position these interacting forces are unbalanced, which fact serves to initiate the automatic seeking of this neutral position with a minimum amount of "hunting," as will be more clearly pointed out in the discussion of the overall operation to be set out below.

Figure 5:
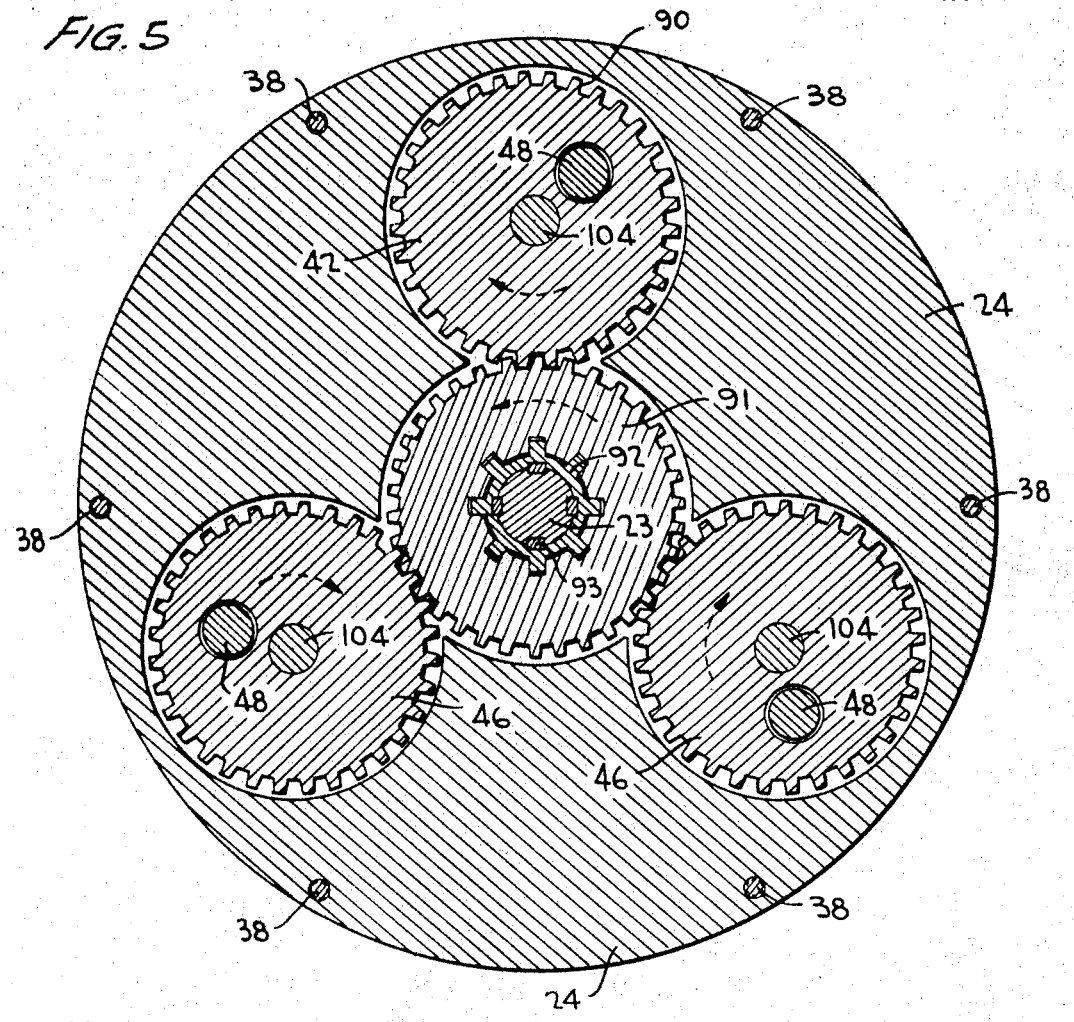
FIGURE 5 is a cross-sectional view taken along line 5—5 showing the eccentric disc mounting of the orbital dual torque control units on the impeller of the planetary gearing unit.

In order for the component force 78 to be a true indicator of the torque in the drive shafts 41 in all positions of the cone 20a, the angle of attack of the control arms 47, 48 in the dual torque control units 40 must remain constant. To do this it is apparent that the drive shafts 41 must be shifted in unison with respect to the central axis of the regulator unit 10 to maintain a constant distance between the driving surface 65 and said shafts 41. Thus, for this purpose, the eccentric discs 42 that support said shafts 41 are provided at their periphery with gear teeth 90 (note FIGURES 2 and 5) which mate with the gear teeth on an intermediate positioning gear 91 that is operated through a limited arc in response to the shifting of the control member 20. This is done through an axially shiftable worm collar 92 that mates with internal gearing on the intermediate gear 91. The worm collar 92 is, in turn, fixed against rotation on the input shaft 23 by a plurality of splines 93 and, as can be seen in FIGURE 2, the worm collar 92 is axially shiftable as indicated along internal chamber 94. The direct connection with the base of the control member 20 is provided by a plurality of spacer bars 95 that are fixed to control boss 96 mounted for rotation with respect to the stationary friction drive cone 20a by a ball bearing 97. As can be seen the radial support for the control member 20 on the rotating input shaft 23 while allowing sliding movement therealong takes the form of a roller bearing 98; it being understood that a similar bearing is provided at the other end of the control member adjacent the rotary connection 22.

In operation, when the friction drive cone 20a is in the limit position shown in FIGURE 2 wherein the friction wheels 60, 61 are contacting the inner drive surface 65 at its major diameter, it can be seen that the spiral collar 92 is positioned at the far left-hand end of the chamber 94, the positioning gear 91 is rotated to its limit position in the clockwise direction (note FIGURE 5) and the support discs 42 are, in turn, rotated to their limit position in the counterclockwise direction so as to position the drive shafts 41 at their outer peripheral limits to properly position the orbital torque control units 40. Equally clear is the fact that upon movement of the friction drive cone 20a to the right, as in FIGURE 2, the positioning gear 91 is rotated in a counterclockwise direction, as noted by the dotted line arrow in FIGURE 5, so as to rotate each of the support discs 42 in a clockwise direction, as also noted by dashed line arrows, thereby bringing the eccentrically mounted drive shafts 41 closer to the central axis along the input shaft 23 whereby the control arms 47, 48 are repositioned and maintained at the same angle of attack as before. In other words, as the drive shafts 41 are moved radially inwardly of the impeller 30 in response to the shifting of the frictional drive cone 20a to the right in FIGURE 2, the angle of attack of the control arms 47, 48 is thus advantageously retained constant whereby the shifting effect or the component force 78 acting on the cone 20a is constant over the full range, as desired.

Figure 6:
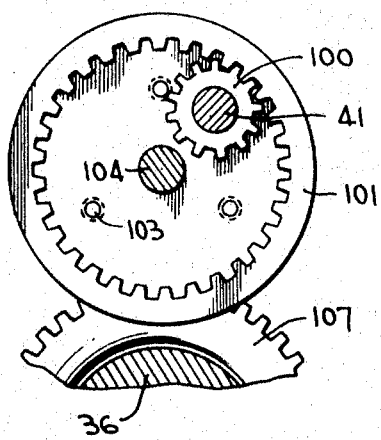
FIGURE 6 is a detailed view taken along line 6—6 of FIGURE 2 showing the construction of the internal drive gears.

Turning now to the gearing arrangement of the planetary gearing unit 24 that is effective to transfer the driving torque from the drive shafts 41 to the output shaft 25, each of said drive shafts 41 has a drive gear 100 carried on the outer end thereof, as can be seen in FIGURES 2 and 6. As the planetary gearing unit 24 rotates and the friction wheels 60, 61 drive the drive shafts 41, the drive gears 100 serve to drive internal orbital transfer gears 101 and similar external orbital transfer gears 102, which are coupled thereto through three coupling screws 103; the composite internal-external gear thus formed being rotatably journaled on a mounting shaft 104 centrally fixed in position on the mounting disc 42 (note FIGURES 2 and 7). A locking key 105 serves to hold the composite gear into position on said shaft 104, which in turn, effectively positions the external orbital drive gear 102 in meshing relationship with an output sun gear 107 that drivingly engages the output shaft 25 through a key 108 and coacting set screw 108*a* (see FIGURE 2). As can be noted from viewing this figure, the output sun gear 107 is rotatably journaled with respect to the input shaft 23 by a suitable ball bearing 109.

Figure 7:
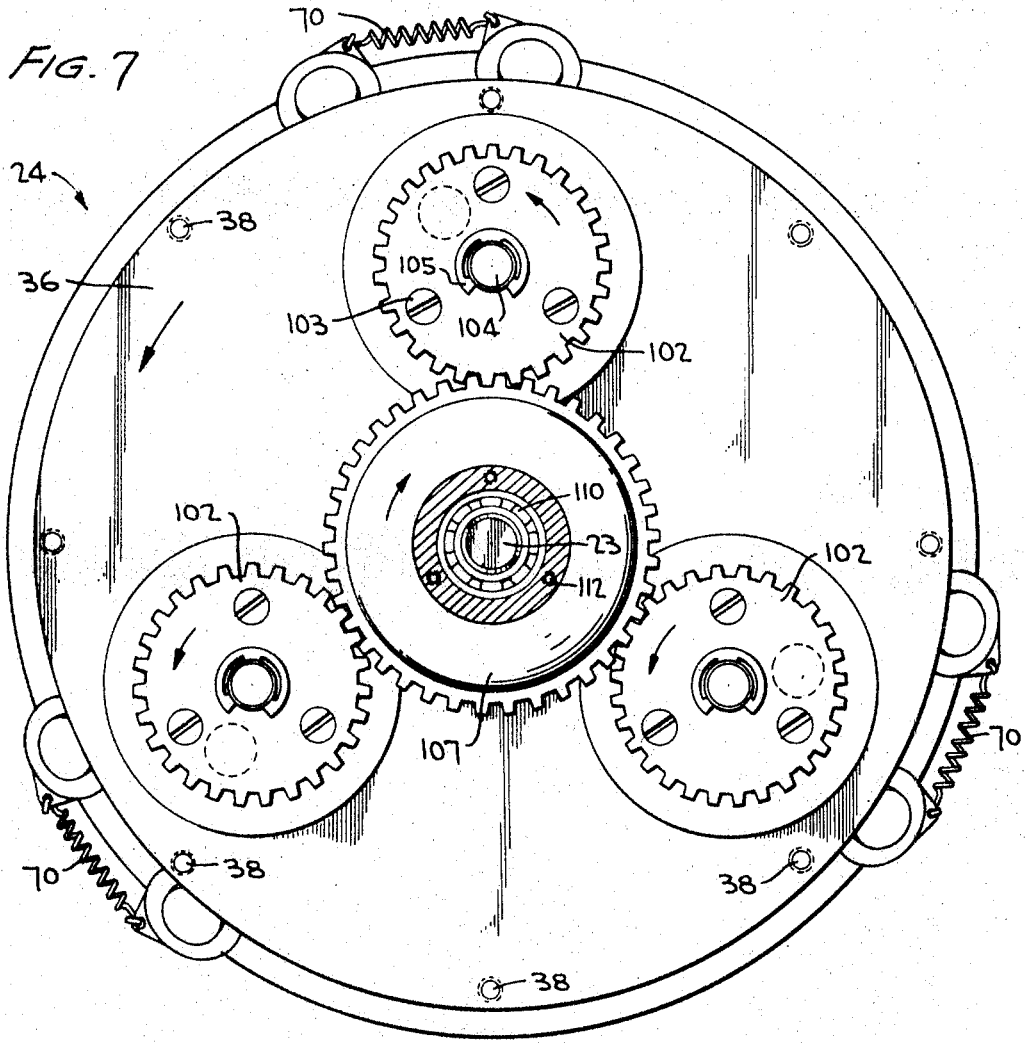
FIGURE 7 is an end view of the power transmission device showing the arrangement of the external orbital drive gears in combination with the driven sun gear.

In FIGURE 7, it can be seen that when the planetary gearing unit 24 is rotating in the counterclockwise direction, as indicated by the solid arrow, the drive shafts 41 are rotating in their own right in the same direction by virtue of their interconnection with the friction wheels 60, 61, as also noted by the solid arrow on these orbital gears 102. With the friction wheels 60, 61 at the maximum outer diameter of the drive cone 20*a*, it will be apparent that the external orbiting drive gears 102 are thus rotating at their maximum speed which means that the output sun gear 107 is driven at its maximum speed in the clockwise direction, as indicated by the solid arrow on this gear. From this, it can thus be realized in the overall operation of the power transmission 17 that the rotation of the input shaft 23 in the clockwise direction, as indicated by the solid arrow in FIGURE 2, causes the orbiting friction wheels 60, 61 to rotate in the counterclockwise direction thereby rotating the drive shafts 41 in the clockwise direction by virtue of the reversing in the bevel gears 55–57; and then with the external drive gears rotating in the same counterclockwise direction as the input shaft 23, the output sun gear 107 is thus rotated in the opposite direction, or clockwise as noted. In this condition, the drive shaft 25 is thus rotated at its maximum speed in the opposite direction from the input shaft 23.

The effective gear ratio through the gears 100, 101, 102 and to the sun gear 107 is such that when the friction wheels 60, 61 are reduced in speed by positioning them toward the center of the drive cone 20*a* to the center path of the driving surface 65, as noted by the full line position of FIGURE 2*a*, the orbiting gears 102 are rotating such that their orbiting speed or bodily movement around the sun gear 107 is just equal to their own rotating speed allowing the gears 102 to step around the gear 107 without causing relative movement of said gear 107. This is of course, then the neutral position and that position at which the constant tension will be held on the output shaft 25 in accordance with the setting of the variable pressure regulator 84 that operates the air cylinder 80 or, in other words, this position is when the component force 78 (FIGURE 2*a*) rendered by the dual torque control units 40 is just equal to the biasing force set on the pneumatic control system 80.

As the friction wheels 60, 61 are moved toward the minor diameter of the driving surface 65, their speed decreases and since the bodily orbiting speed remains the same assuming that there is no change in input speed at shaft 23, the gears 102 now cause the sun gear 107 to be carried along and thus driven in the counterclockwise direction, as viewed in FIGURE 7. Thus, it will be realized that this planetary gearing unit 24 is effective to drive the output shaft over a predetermined range of speeds in the same direction as the input shaft 23 and in the opposite direction; thereby rendering a reversible gearing unit that works toward a one-to-one relationship in both directions. It should be noted in particular, that when the output gear 107 is driven in the counterclockwise direction, as lastly described, the full rotating momentum of the planetary gearing unit 24 is utilized giving a particularly powerful and smooth driving operation. Furthermore, it is evident that the driving relationship begins at an infinite ratio when the output driving is initiated and is variable in a stepless fashion over the full range.

If the planetary gearing unit 24 is to be used as a subcombination of the power transmission 17, it is desirable to provide an output sensor drive train 110 between the output shaft 25 and the rotating output housing 26, as can best be seen in FIGURE 8. This drive train 110 has a driving gear 111, which is fixed to the hub of the output sun gear 107 by any desired number of screws 112, as is shown in FIGURE 2. The driving gear 111 meshes with and drives the idler gear 113 (FIGURE 8) carried by a torque sensor arm 114 pivotally mounted on the output shaft 25; the opposite end of the sensor arm 114 having a control slot 115 for a purpose which will presently be explained. This end of the sensor arm 114 is positioned in an arcuate groove 116 (note FIGURE 1) formed in a top mounting plate 117 securely fastened to the stationary housing 14 by any number of suitable fastening bolts 118.

As can be seen in FIGURE 8, the idler gear 113 engages an internal gear 119 around the rim of the output housing 26 and thus serves to drive the same in response to the power transmitted from the driving gear 111. It will be evident that the drive train 110 is thus capable of acting as a torque sensor for the output shaft 25 in that, for example, when a load is placed on the output shaft 25 to cause rotation of the gear 111 in the clockwise direction, as noted by the full line arrow in this figure, the sensor arm 114 will be bodily rotated in the same direction about the center axis thereby shifting the remote end of the arm 114 in the same direction, as also indicated by a full line arrow in this figure. It will be noted that since this torque sensing operation is being taken directly from the output shaft 25 it is immediately available to provide a correction factor back to the control member 20, in a manner now to be explained.

Thus, to perform this function there is provided a feedback linkage, generally represented by the reference numeral 120, which is mounted on the top mounting plate 117 on an integral upstanding support 121, as can be seen in FIGURES 1 and 8. To explain, the control slot 115 receives the end of a pivotal finger 122 which is carried by a vertical pivot shaft 123, which in turn, is carried by a laterally extending bracket 124 and serves to translate the sensing movement of the finger 122 to a control lever 126. The control lever 126 works through an articulated extension 127 to cause control movement of the main shift rod 128. As shown, the shift rod 128 works through fixed slide blocks 129, 129*a* on the upstanding support 121 and operates the pivotal lever 130 about a pivot shaft 131. The remote end of the pivotal lever 130 is connected through an adjustable link 132 to the control lever 21 so as to be capable of shifting the control member 20 in accordance with a change in torque in the output shaft 25.

For example, upon a sudden increase in torque at the output shaft 25 in the direction of the full line arrow in FIGURE 8, the finger 122 will be pivoted with the pivot shaft 123 in the direction of the arrow shown in FIGURE 1, thus driving the shift rod 128 to the left in FIGURE 1 thereby causing the control lever 21 to be shifted in the counterclockwise direction. This, of course, serves to shift the control sleeve 20 and the integral drive cone 20*a* to the left for positioning of the dual torque control units 40 toward the maximum diameter of the drive cone (note the position 60*a* of FIGURE 2*a*). It will be noted that this correcting force is complementary to the correcting force which takes part in the dual torque control units thus acting against the same biasing force from the pneumatic control system 80. Because of the direct connection to the lever 21 from the sensor drive train 110 at the output shaft 25, the control movement to the lever 21 is exceptionally rapid acting and capable of improving the response time of the regulator 10. It will also be realized that the dual torque control units 40 and the output torque sensor provided by the drive train 110 operate so that when a correction is to be made there is a minimum amount of overshooting or hunting of the friction wheels 60, 61 of the neutral position along the driving surface 65 since as the position is approached from either direction the rotating output speed is being progressively reduced.

It will be remembered that the power sheave S is fixed to the output housing 26 and thus rotates with the same to perform the final work output of the regulator 10. As can be seen in FIGURE 1, the sheave is formed of a main circular plate 140 having an integral hub and a cooperating wobble squeeze plate 141, which moves toward and away from the main plate 140, so as to grip the cable C at an outer peripheral gripping area 142, as noted in this figure. The wobble movement of the squeeze plate 141 is permitted by formation of the hub of the main plate 140 with a curved configuration, and by providing a suitable number of crescent shaped slots 143 in the hub and captive ball bearings 144 in the plate 141, the driving relationship is provided. The gripping area 142 of the sheave S is formed with resilient faces 145 for increasing the frictional clamping force on the cable C.

To automatically vary the clamping force of the sheave S as the torque in the output shaft 25 increases to further insure a slip-free driving relationship, there is provided a sliding pressure rod 150 mounted by block 151 on the free end of the upstanding support 121, which rod 150 carries a roller 152 for pressure engagement with the point of the clamping plate 141 at the gripping area 142 or the uppermost vertical position. This pressure rod 150 is also actuated by the feed-back linkage 120 through an actuating lever 154 pivoted about a fixed pivot 155, it being understood that the end opposite the connection with the pressure rod 150 is loosely positioned about the main slide rod 128 for free movement with respect to the same. A spring 156 positioned between this end of the lever 154 and a fixed collar 157 on the rod 128 forms a resilient connection for this clamping arrangement.

Figure 9:
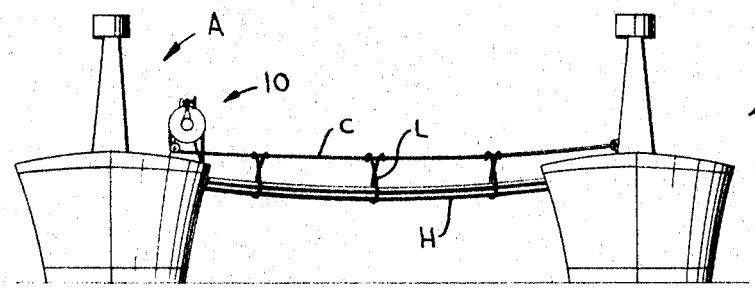
FIGURE 9 is a perspective view of a marine loading and unloading system with which the control line regulator of the present invention may be employed.

To consider the operation of the regulator 10 of the present invention and the manner in which the power transmission 17 maintains a constant tension in a cable C, reference is first made to FIGURE 9, wherein is shown a schematic view of two ships A, B which are engaged in a refueling operation while utilizing the regulator 10 of the present invention mounted on one of the ships, such as the ship A. The control line or cable C is at the other end permanently attached to a portion of the ship B to thus effect the support of a hose H through suitable loops L. There is or may be provided in conjunction with the regulator 10, an idler sheave 160 (FIGURE 8) that is capable of turning the cable from a horizontal position between the ships A, B to a vertical position for receipt by the power sheave S of the regulator 10. On the discharge side of the power sheave S spaced approximately 180° from the input side as shown in FIGURE 8, there is or may be provided a cable storage 161 for receiving and discharging cable as is needed upon demand by the power sheave S.

As will be realized by comparing FIGURES 8 and 9, to maintain the cable C in tension between the ships A and B by control of the cable C, it must be driven in the direction to wind up when the tension slackens, as noted by the dotted line arrow in FIGURE 8, and to pay out as the tension increases, as noted by the full line arrow. Thus, assuming that the line C has been deployed between the ships A, B by conventional projectile means and the cable C is now ready to be maintained in constant tension by the regulator 10 of the present invention, the cable is trained around the idler sheave 160 and in between the jaws at the gripping area 142 of the power sheave S, as indicated. Now assuming that the pressure regulator 84 has previously been set for the desired tension to be maintained on the cable C, and that the cable C is at the present moment in a slackened condition, there will be an absence of torque in the dual torque control units 40 causing the pressure in the cylinder 81 to shift the control lever 21 in a counterclockwise direction (note dashed line arrow in FIGURE 1) to begin a winding up of the cable C and and to initiate a corresponding increase in the tension in the cable C. With the shift of the lever 21, it is clear that the control member 20 is shifted to the right in FIGURE 1, so that the friction wheels 60, 61 assume a relative position 60b, as noted by the dotted outline in FIGURE 2a. When the torque control units 40 are thus positioned on the inner half of the drive cone 20a, the drive shaft 25 is rotating in the same direction as the input shaft 23, or in a counterclockwise direction as noted on gear 111 by the dashed line arrow in FIGURE 8, and this means that the idler gear 113 and the internal gear 119 that drives the output housing 26 is rotating in the clockwise direction thus causing the power sheave S to rotate in the same clockwise direction for imparting the necessary wind-up movement to the cable C, as indicated by the dashed line arrow in FIGURE 8.

As the cable C becomes taut, there is transferred increased torque to the output shaft 25 and thence through the planetary gearing unit 24 to the drive shafts 41 which thereby cause each of the control arms 47 of the torque control units 40 to swing toward the driving surface 65 or in a counterclockwise direction, as viewed in FIGURE 3. In other words, the friction wheel 60 carried by the control arm 47 tends to roll under on the driving surface 65 which thereby increases the driving friction by an increase in the component force 77 (FIGURE 2a) and at the same time causing an increase in the shifting component force 78. The latter causes the drive cone 20a to shift to the left toward the full line position of FIGURE 2a at an inherently progressively slower pace until the full line neutral position is reached. At the neutral position, it will be remembered that the gear ratio of the planetary gearing unit 24 is such to cause the power sheave S to cease from rotating, and in accordance with the present invention at this point the cable is held under continuous tension in accordance with the pressure set by the pnuematic control system 80, as desired.

Remembering that the drive shaft 41 is continuously rotating in the same direction due to the rotation of the input shaft 23 and the planetary gearing unit 24, if there is now an increase in tension on the cable C beyond the set limit, more rotative pressure in the same direction is applied against the control arm 47 of the dual torque control units 40 so that they try to roll under on the driving surface 65 with still more force thereby shifting the drive cone 20a further to the left as viewed in FIGURE 1, and toward the relative position noted by the dotted line outline 60a. This causes the drive shaft 41 to increase its rotational speed past the neutral position thus reversing the direction of rotation of the driving gear 111 of the output drive train 110, so that it now rotates in a clockwise direction as indicated by the full line arrow in FIGURE 8. Following the direction of rotation through the idler gear 113 and thence through the output housing 26 to the power sheave S it will be realized that the cable C is now rotated in the opposite or pay out direction, as indicated by the solid arrows. The cable C is thus payed out at an ever increasing speed as the torque increases to compensate for the increase in tension. As the tension lessens because of this paying out of cable, the friction wheels 60, 61 move over the stepless range of ratios at an ever decreasing speed until the desired tension is once more restored in the cable C and the dual torque control units 40 have returned to their neutral position with said wheels along the center path of the drive cone 20a.

During the foregoing correction operations, it will be realized that the sensor arm 114 (FIGURE 8) is shifted in each instance in the direction opposite to the rotation of the output housing 26, as noted by the respective full line arrows shown in FIGURE 8. Thus following the action through the feedback linkage 120 it will be realized that the control lever 20 is shifted so as to control the control member 20 in the desired direction and in a complementary fashion to the action of the dual torque control units 40. For example, when the tension in the cable C has increased beyond the desired point, the tension on the cable C will tend to rotate the drive train 110, as noted by the arrows, which thereby tends to rotate the control arm 114 in a clockwise direction and this in turn shifts the control lever 21 in a clockwise direction. As explained above, the friction wheels 60, 61 rotate faster as the control member 20 is thus shifted and the relative position 60b is approached, thus tending to speed up the pay out process of the cable C in the event event of a sudden increase in torque at the output to prevent the cable C from breaking. As also explained, the pressure rod 150 presses the roller 152 with increased pressure against the pressure plate 141 at the gripping area 142 of the sheave S thereby advantageously immediately increasing the gripping force on the cable C.

It is pointed out that the control line regulator 10 of the present invention can be quickly and easily adapted for operation on the control cable C in the opposite direction if the occasion arises. This is accomplished by merely reversing the direction of rotation of the input shaft 23 and thus relying on the control arm 48 of the dual torque control units 40 to provide the torque control of the system. In other words, as the planetary gearing unit 24 rotates in the opposite direction to reverse the direction of rotation from that described above, the tension in the cable C and the torque in the output shaft 25 will be translated to the control arm 48 which thus causes a shifting of the control member 20 in the same manner as described above.

As will be realized, the control lever 21 may be manipulated by hand to effect a manual paying out or winding up of the cable C as desired. It should also be clear that any type of line can be driven by the power sheave S although the usual type of wire cable C is most often used. For example, the adjustable power sheave S can be utilized without modification to drive chain, rope of any material, and also cable which has laterally projecting whisker-like elements that prevent whipping or snaking of the cable if the same is being drawn through water. Also with regard to the latter point, the regulator 10 can be easily adapted for underwater environments by merely providing the necessary seals at only a few critical sealing points since the entire unit is self-contained.

To provide further flexibility with regard to the speed of the regulator 10, it is contemplated that the drive cone 20a could be rotated simultaneously with the input shaft 23, or that an additional planetary gearing system could be used, either of which modifications would give an additional range of stepless speed choices to the regulator 10 of the invention.

Thus, the outstanding results and advantages of the present invention lie in the provision of an apparatus for efficient conversion of input torque to a useful, reversible output torque, which apparatus is capable of handling very large loads without slippage or complicated mechanisms, such as is required in prior art clutches and hydraulic torque converters. Furthermore this reversible friction drive is accomplished with the advantage of beginning the driving operation in either direction at an infinite ratio. This is possible by selection of the proper ratio of the planetary gearing unit 24 so that the friction wheels 60, 61 of the torque control units 40 are positioned at the middle of the drive cone 20a in the neutral or home position when the tension in the cable C being controlled is at the selected value. In other words, when the friction wheels 60, 61 are at the center drive path, the output member 25 is locked against rotation and maintains a tension in the cable C in accordance with the force previously set on the pneumatic control system 80. Furthermore, the unit 10 is provided with a feedback system in the form of the feedback linkage 120 and output drive train 110 which is responsive to the torque at the output shaft 25 to thereby complement the function of the dual torque control units 40. Also, as pointed out above, the power sheave S is designed to receive the cable C and drive the same only at a gripping area 142 so that it is received and released with zero pressure and due to the interconnection with the feedback system only the required amount of pressure need be applied to the cable C.

In this disclosure, there is shown and described only the preferred embodiment of the invention, but, as aforementioned, it is to be understood that the invention is capable of use in various other combinations and environments and is capable of changes or modifications within the scope of the inventive concept as expressed by the accompanying claims. In particular, it should be reemphasized as previously pointed out, that the tension regulator 10 and the power transmission 17 are specifically contemplated as being capable of additional uses within the realm of these claims.

I claim:

1. In a power transmission device, the combination of support means, an input member mounted on said support means for rotation about a fixed axis, a planetary gearing unit mounted on said input member for rotation therewith, said unit including a carrier and at least one orbital torque control means mounted on said carrier in radially spaced relationship to said axis, said torque control means including a pivotal control arm and a friction wheel journaled for rotation at the free end of said arm, a drive cone mounted for axial movement along said fixed axis and having a driving surface facing said planetary gearing unit for driving engagement with said friction wheel, an output member rotatively mounted on said support means along said axis and drivingly connected to said friction wheel through said planetary gearing unit, means for biasing said drive cone toward said gearing unit, said control arm being operative to pivotally swing toward said driving surface upon an increase in torque in said output member to move said drive cone away from said gearing unit against said biasing means whereby to regulate the relative driving position of said friction wheel on said driving surface in accordance with the amount of torque in said output member, and means for shifting said torque control means with respect to said axis in response to the adjustment of said drive cone to maintain said control arm at a constant angle with respect to said driving surface, whereby said output member is continuously variably driven in response to the frictional driving relationship between said cone and said friction wheel.

2. The combination of claim 1 wherein said orbital torque control means further comprise an intermediate drive shaft mounted for rotation on said carrier about a second axis parallel to said first axis, said pivotal control arm being carried by said drive shaft, a second pivotal control arm carried on said drive shaft and a second friction wheel being carried by the free end of said second control arm and in operative driving relationship with said driving surface, said control arms being mounted on opposite sides of a perpendicular with respect to the tangent of said driving surface, and resilient means for urging said control arrms toward each other and toward said driving surface of said drive cone to thereby provide dual friction wheel driving engagement therewith.

3. The combination of claim 2 wherein said pivotal control arms of said torque control means are hollow, said second pivotal control arm being mounted on said intermediate drive shaft within the first mentioned control arm.

4. The combination of claim 1 wherein said shifting means includes an eccentric support disc rotatively mounted on said carrier, a spirally splined collar mounted along said fixed axis and journaled for rotation with respect to said input member, gear means around the outer periphery of said disc in operative adjusting relationship with said collar for rotating said disc to position said orbital torque control means with respect to said fixed axis, and spacer means for connecting said collar to said cone for axial movement therewith.

5. The combination of claim 4 wherein said biasing means comprises a pneumatic cylinder connected to said drive cone and regulator means for adjusting the air pressure on said cylinder to thereby vary the amount of torque to be placed on said output member.

6. The combination of claim 1 wherein the gearing ratio of said planetary gearing unit is equal to the rotational driving ratio between said driving surface of said drive cone and said friction wheel along the center path of said driving surface whereby said output member is held against rotation when said friction wheel is in engagement with said center path, the movement of said drive cone toward said planetary gearing unit being such as to cause said output member to rotate in a first direction and the movement of said drive cone away from said planetary gearing unit being such as to cause rotation of said output member in the opposite direction.

7. The combination of claim 6 wherein said friction wheel is tapered so that the effective taper angle of said friction wheel is equal to the taper angle of said drive cone at said center path, whereby a minimum amount of slippage is produced when said friction wheel is positioned at the adjusted limits of said driving surface of said drive cone.

8. A power transmission comprising the combination of support means, an input member mounted on said support means for rotation about a fixed axis, a planetary gearing unit mounted on said input member for rotation therewith, said unit including a carrier and at least one orbital drive means mounted on said carrier in radially spaced relationship to said axis, a stationary drive cone carried by said support means having a driving surface in opposed relationship to said orbital drive means for imparting rotation thereto, said driving surface defining a continuously variable drive path for driving said orbital drive means over a predetermined range of speeds, control means for selectively positioning said orbital drive means along said driving surface, an output member rotatably mounted on said support means along said fixed axis, said planetary gearing unit including an output sun gear connected to said output member, an intermediate drive shaft journaled on said carrier parallel to said fixed axis, orbiting transfer gear means on said drive shaft and meshing with said sun gear for bodily rotating about the same, means for interconnecting said drive shaft to said orbital drive means, the gearing ratio of said sun gear, transfer gear and interconnecting means being such that when said orbital drive means engages said driving surface along the center path thereof said transfer gear means rotates at a speed corresponding to its orbiting speed so as to hold said sun gear against rotation, whereby the movement of said drive cone toward said planetary gearing unit is such as to cause said output member to rotate in a first direction and the movement of said drive cone away from said planetary gearing unit is such as to cause rotation of said output member in the opposite direction.

9. The combination of claim 8 wherein said orbital drive means includes a friction wheel for engaging said driving surface, said friction wheel being tapered so that the effective taper angle of said friction wheel is equal to the taper angle of said drive cone at said center path, whereby a minimum amount of slippage is produced when said friction wheel is positioned at the adjusted limits of said driving surface of said drive cone, an outer drive shaft for supporting said friction wheel in cooperating relationship to said driving surface, said interconnecting means comprising first and second bevel gears selected in accordance with the required angle between said drive shafts.

10. The combination of claim 9 wherein is provided a ball and socket joint to mount said friction wheel on said outer drive shaft whereby said friction wheel is allowed to follow said driving surface more closely, said ball and socket joint including a ball bearing fixed in said outer drive shaft and an arcuate slot in said friction wheel to provide a driving connection with said outer drive shaft through said ball bearing.

11. The combination of claim 8 wherein is provided a drive gear on said intermediate drive shaft, said transfer gear means including an internal gear meshing with said drive gear and an external gear meshing with said sun gear whereby said transfer gear means is caused to rotate in the same direction as said carrier.

12. The combination of claim 8 wherein is further provided an output torque sensor including a driving gear fixed to said output sun gear, a radially extending sensor arm pivotally mounted on said output member, an idler gear carried by said sensor arm and operatively engaging said sun gear, linkage means interconnecting the free end of said sensor arm and said control means, whereby a change in torque on said output member is transferred directly to said control means for automatic corrective positioning action of said driving surface with respect to said drive means to maintain constant torque on said output member.

13. A power transmission comprising the combination of support means, an input member mounted on said support means for rotation about a fixed axis, a planetary gearing unit mounted on said input member for rotation therewith, said unit including a carrier and a plurality of dual torque control units mounted in peripheral spaced relationship on said carrier in radially spaced relationship to said axis, each of said torque control units including first and second pivotal control arms and corresponding first and second friction wheels journaled for rotation at the free end of the respective arm, a drive cone mounted for axial movement along said fixed axis and having a driving surface facing said planetary gearing unit for driving engagement with said friction wheels, said control arms being mounted on opposite sides of a perpendicular with respect to the tangent of said driving surface, resilient means for urging said control arms toward each other and toward said driving surface of said drive cone to thereby provide dual friction wheel driving engagement therewith, one of said control arms of each control unit being operative to rotate toward said driving surface by torque effect upon an increase in torque on said output member to increase the force of said friction wheels against said drive cone thereby tending to axially shift the same along said axis in a first direction, and biasing means acting on said drive cone tending to shift the same in the opposite direction for selectively positioning said dual torque control units with respect to said driving surface.

References Cited

UNITED STATES PATENTS

| 2,634,627 | 4/1953 | Flynn | 74—751 |
| 2,745,297 | 5/1956 | Andrus | 74—751 X |
| 2,928,295 | 3/1960 | Boulanger | 74—751 |
| 3,121,349 | 2/1964 | Bullard et al. | 74—751 |

ARTHUR T. McKEON, Primary Examiner

U.S. Cl. X.R.

74—191; 226—195